(12) United States Patent
Xiang et al.

(10) Patent No.: US 12,175,284 B2
(45) Date of Patent: Dec. 24, 2024

(54) METHOD OF CREATING HIGH AVAILABILITY FOR SINGLE POINT NETWORK GATEWAY USING CONTAINERS

(71) Applicant: SONICWALL INC., Milpitas, CA (US)

(72) Inventors: Dong Xiang, Shanghai (CH); Yunfeng Liu, Shanghai (CH); Zhong Chen, Shanghai (CH)

(73) Assignee: SONICWALL INC., Milpitas, CA (US)

( * ) Notice: Subject to any disclaimer, the term of this patent is extended or adjusted under 35 U.S.C. 154(b) by 225 days.

(21) Appl. No.: 17/350,243

(22) Filed: Jun. 17, 2021

(65) Prior Publication Data

US 2021/0397473 A1 Dec. 23, 2021

Related U.S. Application Data

(60) Provisional application No. 63/041,008, filed on Jun. 18, 2020.

(51) Int. Cl.
*G06F 9/46* (2006.01)
*G06F 9/445* (2018.01)
*G06F 9/48* (2006.01)
*G06F 9/50* (2006.01)

(52) U.S. Cl.
CPC ........ *G06F 9/4856* (2013.01); *G06F 9/44505* (2013.01); *G06F 9/461* (2013.01); *G06F 9/5038* (2013.01)

(58) Field of Classification Search
CPC .... G06F 9/4856; G06F 9/44505; G06F 9/461; G06F 9/5038
See application file for complete search history.

(56) References Cited

U.S. PATENT DOCUMENTS

| | | | |
|---|---|---|---|
| 2011/0167298 A1* | 7/2011 | Lee ..................... | G06F 11/2097 714/E11.131 |
| 2012/0198441 A1* | 8/2012 | Mahdavi ............. | H04L 12/6418 718/1 |
| 2013/0091376 A1* | 4/2013 | Raspudic ............ | G06F 11/1484 714/E11.03 |
| 2014/0233370 A1* | 8/2014 | Khare ................. | H04L 41/0668 370/219 |
| 2018/0278469 A1* | 9/2018 | Gandhi ............... | H04L 12/2869 |

* cited by examiner

*Primary Examiner* — Tammy E Lee
(74) *Attorney, Agent, or Firm* — Polsinelli LLP (57) ABSTRACT

Methods and apparatus consistent with the present disclosure may be used in environments where multiple different virtual sets of program instructions are executed by shared computing resources when different processes are performed in a virtual computing environment. Methods consistent with the present disclosure may be used to provide a form of redundancy that does not require two physically distinct computers. Such methods may use a set of physical hardware components and two or more sets of synchronized virtual gateway software. Architectural features of physical hardware components included in an apparatus consistent with the present disclosure may be abstracted from sets of virtual program code when one virtual software process backs up another virtual software process at the apparatus.

20 Claims, 5 Drawing Sheets

METHOD OF CREATING HIGH AVAILABILITY FOR SINGLE POINT NETWORK GATEWAY USING CONTAINERS

CROSS REFERENCE TO RELATED APPLICATIONS

The Present Application claims the priority benefit of U.S. provisional application 63/041,008 filed Jun. 18, 2020, the disclosure of which is incorporated herein by reference.

BACKGROUND OF THE INVENTION

Field of Invention

The present disclosure generally relates to providing redundancy in a computer system. More specifically, the present disclosure relates to synchronized sets of redundant software.

Description of the Related Art

Every day computers process data received from other computers as a normal course of business. Typically data is passed from computer to computer via a computer network in the form of data packets. After a computer receives a data packet from another computer, the received data packet must be analyzed or otherwise processed. Furthermore, today there is a growing trend to design and build computer programs that are 'virtualized.' While instructions in a set of virtualized of software may be executed by physical processing hardware, a given set of virtualized software is abstracted from physical attributes of actual computing resources or processor architectures. In certain instances, instructions included in a single set of virtualized software may be executed by different types of processors. To accomplish this, a set of virtualized software may pass data to other software processes that are designed to operate on a particular type of processor via a programming interface. This means that virtualized software may be designed to include various capabilities that are independent of physical computer hardware used to process instructions associated with the virtualized software. Because of this, it may be possible for a set of virtual software to be run on a processor compatible with the Intel processing architecture or on a processor of another architecture (e.g. the ARM processing architecture), for example.

Many computers that access the Internet today are located within private computer networks that are sometimes referred to as a private Intranet. Computers that reside within such private networks are often protected from malware, spam, or other software that could damage or that could steal private computer data by computing devices that are commonly referred to as gateways or firewalls. When a computer within a computer network attempts to access the Internet, an access request will commonly be passed through a gateway. After a gateway receives an access request from a computer for data that resides at another computer that is not within the private network, it will receive data packets from the other computer after which the gateway may process those data packets. This processing may include scanning for viruses and performing deep packet inspection (DPI) scanning when the gateway protects computers within the private network from being exploited or damaged by malware that could be included in received data packets. While gateways or firewalls may benefit from techniques consistent with the present disclosure, these techniques are not limited to gateways or firewalls.

Gateways and firewalls provide functions that are indispensable in the world of computing today. Even a temporary failure of a gateway to provide safe access to data residing on the Internet can result in thousands of dollars of losses to a company. Because of this, many corporate networks use two or more gateways. In an instance where one of these gateways fails, a second gateway may take over operations performed by the failing gateway. Such operations are commonly referred to as a "failover" or "failing over" from one computer to another. It is also desirable for operations performed by a first gateway to fail over to the second gateway without losing track of operations that the first gateway was performing when it failed.

The use of a second computer to act as a replacement gateway is both expensive and technically cumbersome. First of all, a company has to purchase and operate two or more computers, has to house those computers in a data center, and has to provide power those computers. Furthermore, when one physical gateway device backs up a second physical gateway, a first operational gateway must share information continuously with the second gateway such that a fail over can occur with minimal disruption. The sharing of this information can also be problematic as any communication failure relating to this information sharing can result in the failure of a failover operation. All of this redundancy and complexity more than doubles the price of a single gateway computer.

Various types of errors can occur that can disrupt an apparatus that executes program code instructions. Errors that sometimes disrupt the operation of a set of program code may be caused by imperfect software program code that are often referred to a software bugs, may be caused race states associated with different asynchronous processes, may be caused by excessive electrical noise in a computer system, or may be caused by radiation that can change the status of bits in a memory, integrated circuit, or processor. A software bug may be located in a code pathway that is not frequently accessed, yet when accessed may cause a set of program code to crash. Two different asynchronous processes, for example processes performed when a processor executes instructions and the receipt of a data packet may have a timing that violates a timing requirement for a processor or other hardware at a computing device. Such timing violations may a cause a processor not to receive correct information and this could cause a software process at the processor to crash or otherwise error. Radiation, such as electromagnetic fields, normal ambient radiation, and cosmic rays or excessive electrical noise can cause a processor to make errors that can cause a software process to crash or error.

What are needed are ways to provide redundancy of gateway computer functions without requiring redundant sets of computers. What are also needed are methodologies that provide software redundancy when a particular set of virtual software stops operating properly.

SUMMARY OF THE CLAIMED INVENTION

The presently claimed invention relates to a method, a non-transitory computer readable storage medium, and an apparatus that may execute functions consistent with the present disclosure. A method consistent with the present disclosure may process data packets by a first virtual process at a computer and may receive state information associated with the processing of the data packets, this state information may be accessible by a second virtual process at the computer. A method consistent with the present disclosure may also identify that the first virtual process has stopped processing data packets and may continue processing the data packets by the second virtual process based on the state information received from the first virtual process.

When the method of the present disclosure is implemented as a non-transitory computer-readable storage medium, a processor executing instructions out of a memory may also process data packets by a first virtual process at a computer and may receive state information associated with the processing of the data packets, this state information may be accessible by a second virtual process at the computer. The processor executing instructions out of the memory may also identify that the first virtual process has stopped processing data packets and may continue processing the data packets by the second virtual process based on the state information received from the first virtual process.

An apparatus consistent with the present disclosure may include a first hardware network interface that receives data packets via a first computer network, a memory, and a processor that executes instructions out of the memory. This process may execute instructions out of the memory to process data packets by a first virtual process at a computer and may receive state information associated with the processing of the data packets, this state information may be accessible by a second virtual process at the computer. The processor executing instructions out of the memory may also identify that the first virtual process has stopped processing data packets and may continue processing the data packets by the second virtual process based on the state information received from the first virtual process.

DETAILED DESCRIPTION

Methods and apparatus consistent with the present disclosure may be used in environments where multiple different virtual sets of program instructions are executed by shared computing resources when different processes are performed in a virtual computing environment. Methods consistent with the present disclosure may be used to provide a form of redundancy that does not require two physically distinct computers. Such methods may use a set of physical hardware components and two or more sets of synchronized virtual gateway software. Architectural features of physical hardware components included in an apparatus consistent with the present disclosure may be abstracted from sets of virtual program code when one virtual software process backs up another virtual software process at the apparatus.

Figure 1:
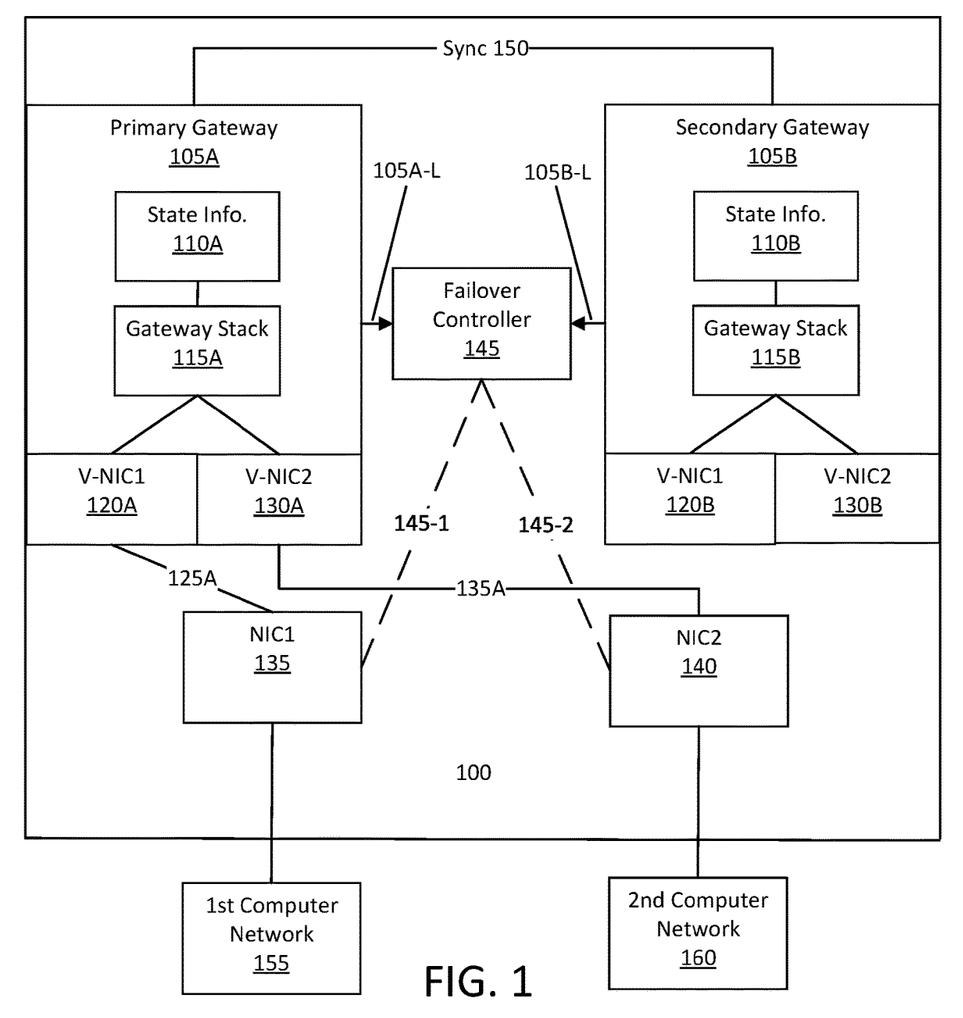
FIG. 1 illustrates a computing system that connects to two separate computer networks when functions consistent with a primary gateway device and a backup gateway device are implemented within the computing system.

FIG. 1 illustrates a computing system that connects to two separate computer networks when functions consistent with a primary gateway device and a backup gateway device are implemented within the computing system. Computing system 100 of FIG. 1 includes a first set of virtual program code (i.e. a first container) that performs the functions of a primary gateway 105A, a second set of virtual program code (i.e. a second container) that performs the functions of a secondary backup gateway 105B, a first hardware network interface controller (NIC1) 135, and a second network interface controller (NIC2) 140. Primary gateway 105A includes several different software modules that include a state information 110A module, a gateway stack 115A module, a first virtual network interface controller module (V-NIC1) 120A, and a second virtual network interface controller module (V-NIC2) 130A. Secondary gateway 105B includes software modules that are capable of performing the same functions as the software modules of primary network interface controller 105B. As such, secondary gateway 105B includes software modules of a state information 110B module, a gateway stack 115B module, a first virtual network interface controller module (V-NIC1) 120B, and a second virtual network interface controller module (V-NIC2) 130B.

The computing system 100 of FIG. 1 also includes failover controller 145 that may itself be implemented as a virtual software module or process, a first computer network 155, and a second computer network 160. Communication line 125A indicates that the first virtual network interface controller 120A of primary gateway 105A is configured to communicate over the first computer network 155 via hardware network interface controller 135 of FIG. 1. Communication line 135A indicates that the second virtual network interface controller 130A of primary network interface controller 105A is configured to communicate over the second computer network 160 via the second hardware network interface controller 140. Failover controller 145 may monitor the liveness of either the primary gateway 105A or the secondary gateway 105B or both by monitoring information received via communication lines 105A-L and 105B-L. Communications revived via communication lines 105A-L and 105B-L may include periodic communications (e.g. heartbeats) or other information that indicates that operations of either or both the primary gateway 105A and/or the secondary gateway 105B are still functioning properly. Dashed communication lines 145-1 and 145-2 may allow failover controller 145 to configure which virtual network interface controllers (120A, 130A, 120B, & 130B) are communicatively coupled to particular hardware network interface controllers (135 & 140). FIG. 1 also illustrates that hardware network interface controller 135 is coupled to the first computer network 155 and that hardware network interface controller 140 is coupled to the second computer network 160 of FIG. 1. The hardware network interface controllers 135 and 140 may be connected to the first computer network 155 or the second computer network 160 based on configuration information received from failover controller 145. Either of the first computer network 155 and the second computer network 160 or both may be wired or wireless data communication networks standard in the art.

Each of the virtual network interface controller (V-NIC) of FIG. 1 is capable of provided packet input/output (I/O) services for a particular container (e.g. virtual gateway 105A or 105B). Each of the V-NICs (120A, 130A, 120B, & 130B)

of FIG. 1 may be configured with a same set of features and functions, where a first V-NIC and a second V-NIC of an active (i.e. primary) virtual gateway will receive data from and send data to a respective computer network (155 or 160) of FIG. 1. A first V-NIC and a second V-NIC of an inactive (or backup a secondary) virtual gateway will not actively receive data from and send data to a computer network. In operation state information/data may be sent from a primary virtual gateway to a secondary/backup virtual gateway via communication line 150 of FIG. 1 that allows functions currently being performed by the primary gateway 105A to be picked up by secondary gateway 105B when the primary gateway 105A experiences an error or failure.

Figure 2:
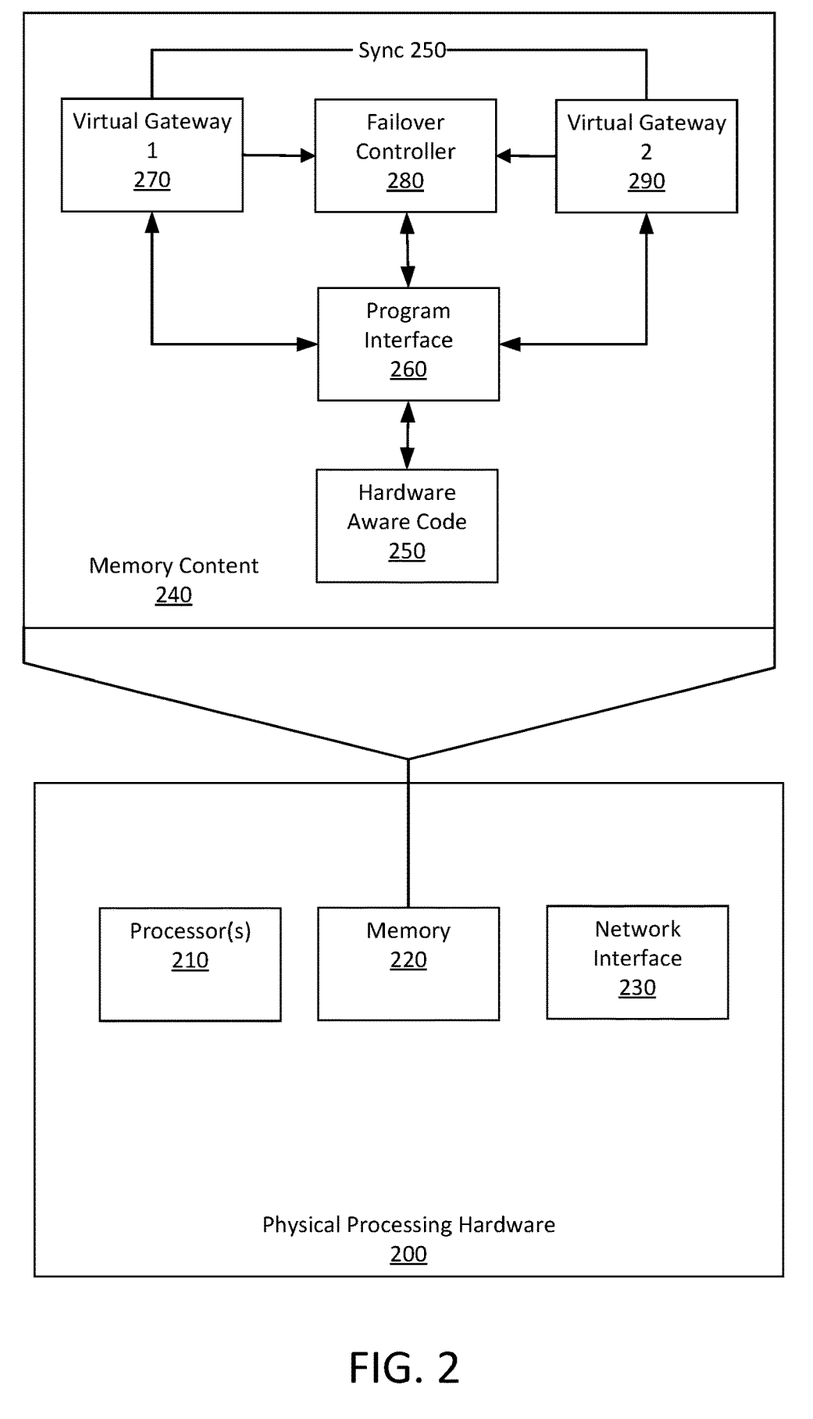
FIG. 2 illustrates a set of physical processing hardware components consistent with the present disclosure and illustrates various sets of program code that may be stored in a memory.

The communication lines illustrated in FIG. 1 (105A-L, 105-B-L, 125A, 135A, 145-1, and 145-2) may be implemented as a set of virtual operations where data is passed through a program interface, such as the program interface 260 of FIG. 2. This means that connections 125A, 135A, 145-1, 145-2, and 150 may be virtual connections that pass data via virtual operations. These virtual operations may allow configuration information, state information, or network communications (e.g. data packet information) to be passed from one virtual process to another via communications that pass through a program interface (such as 260 of FIG. 2) using hardware aware code (such as code 250 of FIG. 2). These virtual communications may result in the storing or retrieving of data at a memory (such as memory 220 of FIG. 2) based on instructions executed by one or more processors (such as processors 210 of FIG. 2).

Gateway stacks 115A & 115B of FIG. 1 may provide functions of a standard hardware gateway computer, such as routing of data packets, connection establishment, the establishing of state information in a system cache, packet processing, packet inspection (e.g. deep packet inspection—DPI), the running of anti-malware scanners, interacting with other computers that analyze computer data for malware, or for tracking or looking up of context information associated with communications between different computers. The state information modules 110A & 110B of FIG. 1 may control the transfer, receipt, or storage of state data that may be stored in a memory or database. This stored state information facilitates the receipt and transfer of data packets between computer systems.

In certain instances, a gateway consistent with the present disclosure may not include redundant pieces of hardware and the methods consistent with the present disclosure may provide redundancy using multiple different redundant sets of virtual software program code. Alternatively, a gateway consistent with the present disclosure may include some pieces of redundant hardware. For example, gateway 100 of FIG. 1 could include multiple different hardware network interface controllers that can connect to the first computer network 155 of FIG. 1. Gateway 100 could also include multiple different hardware network interface controllers that can connect to the second computer network 160 of FIG. 1. In either instance, gateway 100 includes redundant sets of virtual program code that are synchronized using shared state information sent via communication pathway 150.

In instances where an error occurs that renders an active first set of program code inactive, processes that were previously being handled by the first set of program code may be picked up by a second set of program code with little or no delay. This failover process may be entirely transparent to users of the gateway as no data packets may be lost or corrupted during the failover process. The shared state information allows the second set of program code to take over operations that were previously being performed by the first set of program code. Errors that can occur may have been caused by imperfect software program code (i.e. software bugs), race states associated with different asynchronous processes, excessive electrical noise, or may be caused by radiation (e.g. electromagnetic waves, radiation, or cosmic rays).

Table 1 illustrates exemplary state information that may be sent from, received by, or stored by state information module 110A or 110B of FIG. 1. The state information of Table 1 includes different types of attribute data that include: creation time, expiry time, source Internet protocol (IP) address, source port identifying information or number, a communication protocol type, a destination IP address, and information that identifies a destination port identifier or number. Information stored in table 2 provides a description for each of the different types of attribute data of table 1.

Note that table 1 indicates that a creation time may be a timestamp that identifies when a record of a communication was established/created. This typically occurs when a new communication channel is created or when data packets with new attributes are received. Table 2 includes a list of descriptions that define what each of the attributes in table 1 may be. Table 2 identifies that a creation time may be a time a record is created and that this creation may be associated with the receipt of data packets that include new attributes. An expiry time is a time that identifies a lifetime of a record. Once an expiry time has transpired, data relating to that record may be deleted. Table 2 also identifies that source IP and destination IP are respectively internet protocol addresses from which data is received and to which data is sent. Source ports and destination ports may respectively be number of ports where data is respectively received and sent. Table 2 also identifies exemplary protocols that may be supported by methods and apparatus consistent with the present disclosure. The incoming network interface controller (NIC) and outgoing network interface controller may be respective virtual NICs that receive data from and send data to other computing devices.

Communications from a source computer may pass through a physical or virtual source port and a physical or virtual destination port as data is sent from the source computer to the receiving computer through gateway 100 of FIG. 1. Incoming NIC and outgoing NIC may identify respective virtual network interface controllers of an active virtual network interface controller.

Data stored in a third column of table 1 identifies that a second record (Record 2) of communications was created on May 4, 2018 at a time of 15 hours, 55 minutes, and 27.220094 seconds. This record 2 currently has an expiry time of 120 seconds and is receiving data from a source IP address of 198.199.88.104 via port 1514 according to the transfer control protocol (TCP). Record 2 also identifies a destination IP address of 10.103.10.233 and a destination port of 443. Finally record 2 indicates that the presently active virtual gateway is using V-NIC1 as an incoming NIC and is using V-NIC2 as an outgoing NIC.

TABLE 1

Stateful Information

| Attribute | Record 1 | Record 2 |
|---|---|---|
| Creation Time | 2018 Apr. 20 09:26:19.4833327 | 2018 May 04 15:55:27.220094 |
| Expiry Time | 30 | 120 |

TABLE 1-continued

Stateful Information

| Attribute | Record 1 | Record 2 |
| --- | --- | --- |
| Source IP | 192.168.8.127 | 198.199.88.104 |
| Source Port | N/A | 1514 |
| Protocol | ICMP | TCP |
| Destination IP | 192.168.8.1 | 10.103.10.233 |
| Destination Port | N/A | 443 |
| Incoming NIC | Virtual NIC1 | Virtual NIC1 |
| Outgoing NIC | Virtual NIC2 | Virtual NIC2 |

As mentioned above table 2 identifies a series of exemplary protocols that may be used by gateway 100, these include various protocols supported by the requirements for Internet Host Communication protocols (i.e. RFC compliant communication protocols). The protocols identified in table 2 include the Internet message protocol (ICMP), the transfer control protocol (TCP), the user datagram protocol (UDP), or another designated protocol that may or may not be standard.

TABLE 2

Stateful Information Descriptions

| Attribute | Description |
| --- | --- |
| Creation Time | Timestamp when the record is created. My be triggered by a new arrived packets with new attributes |
| Expiry Time | The Expiry Time identifies a remaining lifetime a record. Once expired, the record is invalid. |
| Source/Destination IP | Source/Destination IP addresses of a Packet Stream |
| Source/Destination Ports | Source Port Designator & Destination Port Designator |
| Protocol | Exemplary Protocols Include: ICMP, TCP, UDP, or other designated protocol. |
| Incoming NIC | Virtual NIC from which Packets are Received |
| Outgoing NIC | Virtual NIC to which Packets are Sent |

FIG. 2 illustrates a set of physical processing hardware components consistent with the present disclosure and illustrates various sets of program code that may be stored in a memory. The physical processing hardware 200 of FIG. 2 includes processor(s) 210, memory 220, and network interface 230. Content 240 (e.g. respective sets of program code/instructions) stored in memory 220 may include a set of hardware aware program code 250, a program interface 260 set of program code, and three different sets of virtual program code of 270, 280, and 290.

Each set of virtual process code 270 and 290 may share parameters with the hardware aware code 250 by providing data to and receiving data from program interface code 260 without any of the sets of virtual program code 270 or 290 being aware of certain features or an architecture associated with the physical processing hardware 200. In certain instances, program interface, 260 may be integrated into hardware aware code 250 as a single computer program. Program interface 260 may allow compatible software processes to provide data to and to receive data from hardware aware code 250. To accomplish this, data stored in memory 220 may be updated based on data received from a virtual process and operation of processor(s) 210. For example instructions executed by processor(s) 210 may allow data to be provided from one software process to another by updating data or variables stored in memory. This data may be passed through program interface 260 that abstracts the actual physical processing hardware 200 from virtual program code 270 and 290. Using this information processor(s) 210 executing instructions from the hardware aware code 250 may access memory when performing tasks abstractly for a set of virtual program code (270 or 290). The execution of the hardware aware code by the processor(s) 210 may allow data to be provided to the set of virtual program code via program interface 260. Operations of the failover controller 280 may be performed by a set of hardware or by a set of program code that may also be a virtual set of program code.

The architecture reviewed in FIG. 2 may be used to implement functions discussed in respect to FIG. 1 above to pass configuration information, state information, or network communications (e.g. data packet information) from one virtual process to another via communications that pass through a program interface 260 using hardware aware code 250 of FIG. 2. These virtual communications may result in the storing or retrieving of data at memory 220 based on instructions executed by one or more processor(s) 210. The architecture of FIG. 2 may be used to identify that a first virtual gateway 270 has failed and may perform a failover to a second virtual gateway 290 based on state data that is available to the second virtual gateway. Ultimately, physical hardware is used to receive computer data, process that computer data, and send computer data based on a set of virtual processes. Because of this, a single set of virtualized program code could interact with program interface code that is connected to program code that actually controls one type or another type of computer hardware. As such, a set of virtualized programs could operate with either an Intel architecture multi-processor and could operate on another type of processor architecture (e.g. an ARM processor).

Figure 3:
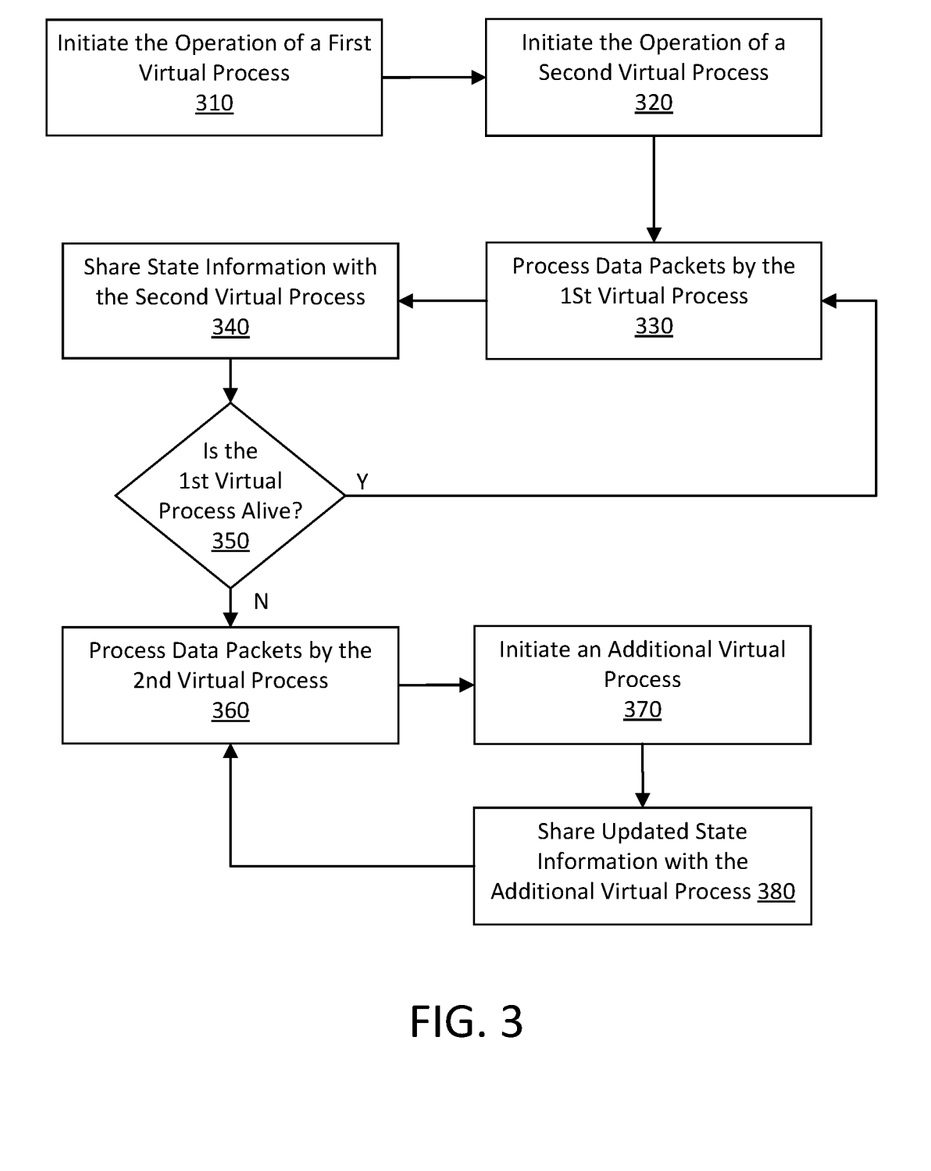
FIG. 3 illustrates a series of steps where different sets of program code at a computer operate to provide redundant functionality using two or more sets of virtual program code.

FIG. 3 illustrates a series of steps where different sets of program code at a computer operate to provide redundant functionality using two or more sets of virtual program code. Step 310 of FIG. 3 is where the operation of a first virtual process is initiated. This first virtual process may be the primary gateway 105A discussed in respect to FIG. 1 or may be the functionality performed by the first virtual gateway 270 of FIG. 2. Next in step 320, the operation of a second virtual process is initiated. This second virtual process may be the primary gateway 105B discussed in respect to FIG. 1 or may be the functionality performed by the second virtual gateway 290 of FIG. 2.

After the first and second virtual processes are initiated, data packets may be processed by program code associated with the first virtual process and this first virtual process may share state information with the second virtual process in step 340 of FIG. 3. The state information shared in step 340 may include any of the information discussed in respect to tables 1 and 2 of this disclosure. This state information may be shared by reading and writing to memory 220 of FIG. 2 by passing that state information through program interface 260. Determination step 350 may then identify whether the first virtual process is still alive. This determination may be made based on information received from a failover controller that receives liveness information from at least an active first virtual process. As such, this liveness information may be received from the first virtual process. Additionally, liveness information may be received from an inactive virtual process. Some of the steps illustrated in FIG. 3 may be performed by a third virtual process executing at computer system. This liveness information may include heartbeat or other data written to memory by the first virtual process and read from the memory by the second virtual process periodically. When determination step 350 identifies that the first virtual process is alive, program flow may move back to step 300 where the first virtual process continues to process data packets. As long as the first virtual process is alive, program flow may move between step 330, 340, 350, and back to 340 as the first virtual process continues to process data packets.

When determination step 350 identifies that the first virtual process is not alive, program flow may move to step 360, where the data packets are processed by program code associated with the second virtual process. Next, in step 370 an additional virtual process may be initiated. The initiation of the virtual process in step 370 may be a restart of the first virtual process of step 310. This additional virtual process may be yet another virtual gateway process that is synchronized with operations of the second virtual process by state information shared in step 380 of FIG. 3. Program flow may then move back to step 360 where the second virtual process processes data packets. After the third virtual process is initiated, the aliveness of the second virtual process may be monitored. In an instance when the second virtual process fails, the additional virtual process may take over the packet processing tasks that were being performed by the second virtual process. As such, methods consistent with the present disclosure may spawn new processes to maintain the redundancy required to failover processes performed by one process to another and then to another.

While FIGS. 1-3 discuss a first virtual gateway and a second virtual gateway that provide redundant capabilities, these may not be the only redundant set of virtual processes operating at a computer system. For example, a set of virtual processes (including a first and a second gateway process) may be created for each communication connection. As such, each host computer that the gateway connects to could include a unique set of redundant virtual processes. In certain instances, even the functionality of a virtual failover controller process could be redundantly backed up.

Figure 4:
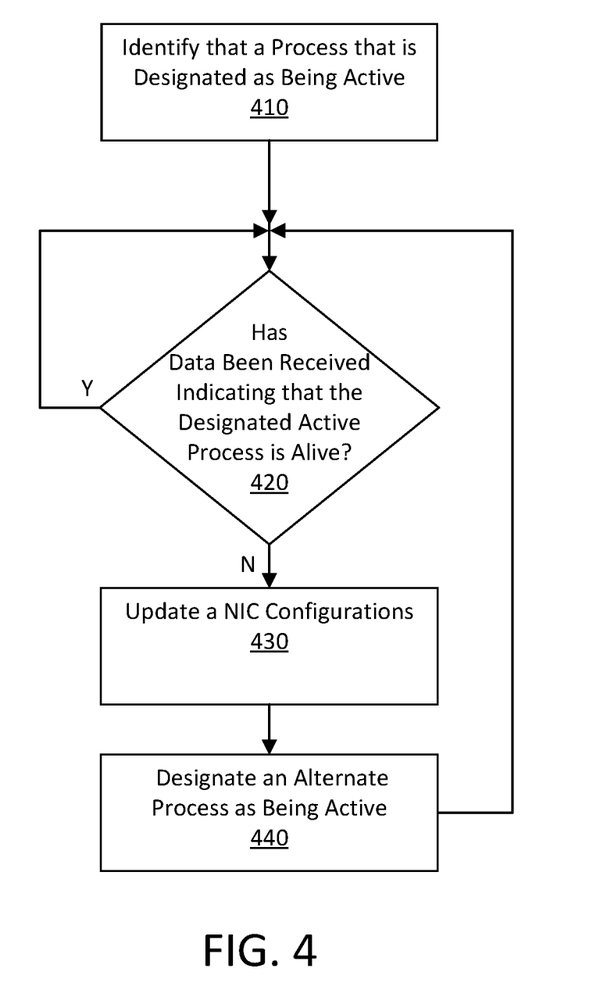
FIG. 4 illustrates a set of steps that may be performed by a set of program code that monitors whether an active virtual process is alive.

FIG. 4 illustrates a set of steps that may be performed by a set of program code that monitors whether an active virtual process is alive. FIG. 4 begins with step 410 that identifies that a virtual process has been designated as active. This designation may be included in a set of configuration data associated with a set of virtual processes. For example a first process that implements a first virtual gateway and a second process that implements a second virtual process may share a set of configuration information. This configuration information may identify both an active virtual process and a related currently inactive virtual process. In certain instances, a first virtual gateway may be backed up by more than one other virtual gateways. Furthermore, these various individual virtual processes may be monitored by other processes such that functionality can be failed over to another virtual process as required. Determination step 420 is a step that identifies whether data has been received that indicates whether the designated active virtual process is alive, when yes, program flow may move back to determination step 420. When determination step 420 identifies that the designated active virtual process is not alive, program flow may move to step 430 where connections of a network interface controller (NIC) are updated.

The updates performed in step 430 may update sets of configuration information relating to what virtual NIC is communicatively linked to a particular hardware NIC during a failover process. This may result in connection 125A being switched to connect to V-NIC1 120B of secondary gateway 105B of FIG. 1. This may also result in connection 135A being switched to connect to V-NIC2 130B of FIG. 1. After step 430 program flow may move to step 440, where an alternate virtual process is designated as being active. Steps 430 and 440 may be performed when operations failover from primary gateway 105A to secondary gateway 105B of FIG. 1. This failover process may result in the updating of various sets of configuration information, the initiation of an additional backup virtual process, and the sharing or updating of state information. After step 420, program flow may move back to determination step 420, where operations performed by the newly designated active process is monitored for liveness. The steps of FIG. 4 may be implemented in conjunction with the steps of FIG. 3, for example by instructions associated with step 350 of FIG. 3.

Figure 5:
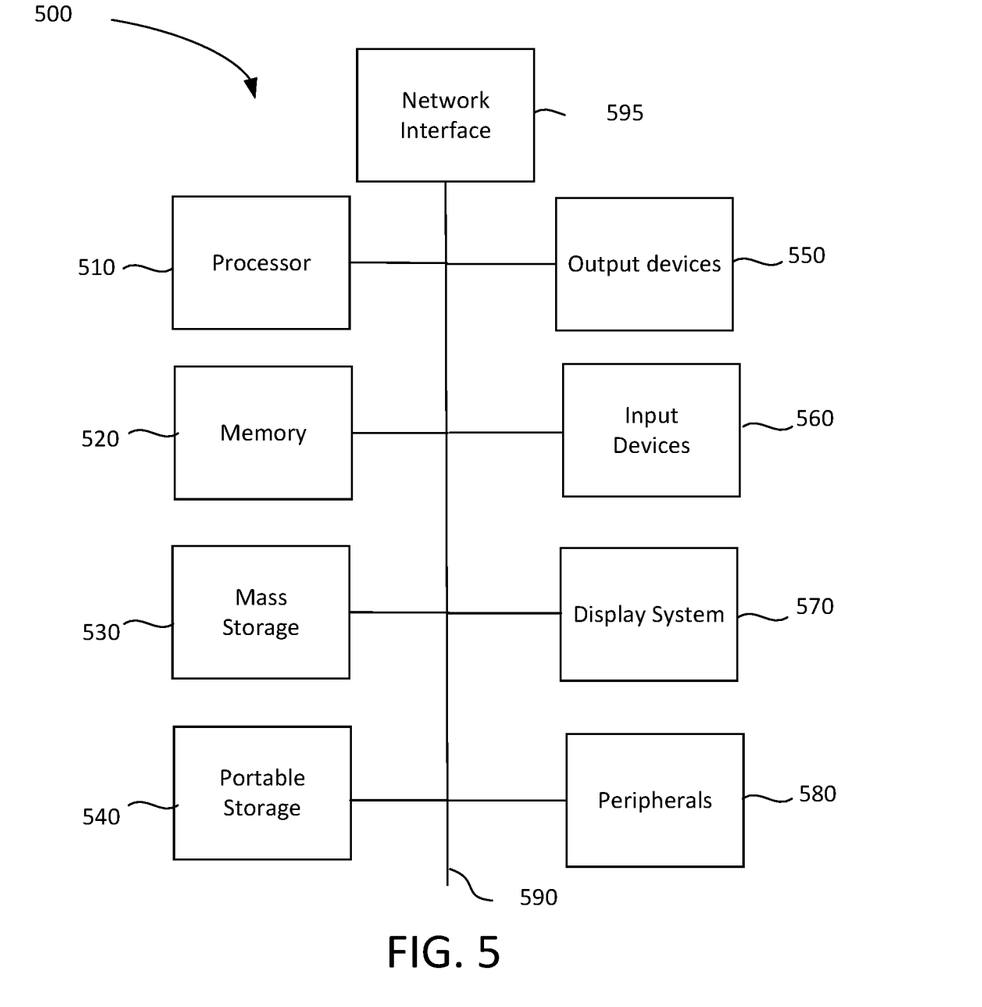
FIG. 5 illustrates a computing system that may be used to implement an embodiment of the present invention.

FIG. 5 illustrates a computing system that may be used to implement an embodiment of the present invention. The computing system 500 of FIG. 5 includes one or more processors 510 and main memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, peripheral devices 580, and network interface 595.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a FLASH memory, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD), a plasma display, an organic light-emitting diode (OLED) display, an electronic ink display, a projector-based display, a holographic display, or another suitable display device. Display system 570 receives textual and graphical information, and processes the information for output to the display device. The display system 570 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 580 may include any type of computer support device to add additional functionality to the computer system. For example, peripheral device(s) 580 may include a modem or a router.

Network interface 595 may include any form of computer interface of a computer, whether that be a wired network or a wireless interface. As such, network interface 595 may be an Ethernet network interface, a BlueTooth™ wireless interface, an 802.11 interface, or a cellular phone interface.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 500 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a FLASH memory, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for providing redundancy in a computer, the method comprising:
performing a plurality of processing operations on data packets by a first virtual process at the computer;
receiving state information associated with the processing operations performed by the first virtual process on the data packets, the state information accessible by a second virtual process at the computer;
identifying an inactive state of the first virtual process;
generating one or more configuration updates that determine which of a plurality of virtual network interface controllers is linked to which of a plurality of hardware network interface controllers, wherein the one or more configuration updates further identify that the second virtual process is active and synchronized in accordance with the state information for continued performance of the processing operations on the data packets;
continuing the processing operations on the data packets by the second virtual process based on the state information, wherein the second virtual process continues performance of the processing operations on the data packets based on the one or more configuration updates;
generating a third virtual process that is synchronized in accordance with second state information for continued performance of the processing operations by the second virtual process, wherein the third virtual process is designated as a backup process, and wherein the second state information associated with the processing operations performed by the second virtual process is accessible by the third virtual process; and
instructing the third virtual process to process a set of remaining data packets unprocessed by the second virtual process upon detection of inactivity of the second virtual process based on the second state information accessible by the third virtual process.

2. The method of claim 1, further comprising initiating operation of the third virtual process at the computer.

3. The method of claim 2, further comprising:
receiving a first set of liveness information associated with the first virtual process, wherein identifying the inactive state of the first virtual process is based on the first set of liveness information; and
receiving a second set of liveness information associated with the second virtual process.

4. The method of claim 2, further comprising:
receiving additional state information from the second virtual process;
identifying that the second virtual process has stopped processing additional data packets; and
continuing to process the additional data packets by the third virtual process based on the additional state information provided by the second virtual process.

5. The method of claim 1, further comprising:
initiating the first virtual process at the computer;
initiating the second virtual process at the computer;
configuring the first virtual process to receive the data packets via a first hardware network interface controller of the plurality of hardware network interface controllers; and
receiving the data packets via the first hardware network interface controller by the first virtual process based on an initial configuration.

6. The method of claim 5, further comprising:
configuring the first virtual process to send the data packets via a second hardware network interface controller of the plurality of hardware network interface controllers; and sending the data packets via the second hardware network interface controller by the first virtual process based on the initial configuration.

7. The method of claim 1, further comprising:
monitoring for liveness of the first virtual process, wherein the liveness corresponds to an active or inactive state of the first virtual process; and
receiving a first set of liveness information associated with the first virtual process, wherein the first set of liveness information indicates the first virtual process is active.

8. The method of claim 1, further comprising storing information regarding an initial configuration that identifies that the first virtual process is in an active state and that the second virtual process is available to take over processing tasks from the first virtual process.

9. The method of claim 1, further comprising:
initiating an initial set of processing operations on initial data packets received via a first communication session that is different from a second communication session associated with the data packets processed by the first virtual process, the initial set of processing operations associated with an active virtual process and an inactive virtual process;
receiving additional state information associated with the processing operations of the initial set performed by the active virtual process;
identifying that the active virtual process has erred; and
processing the initial data packets received via the first communication session by the inactive virtual process in accordance with the additional state information based on the identification that the active virtual process has erred.

10. A non-transitory computer-readable storage medium having embodied thereon a program executable by a processor for implementing a method for providing redundancy in a computer, the method comprising:
performing a plurality of processing operations on data packets by a first virtual process at the computer;
receiving state information associated with the processing operations performed by the first virtual process on the data packets, the state information accessible by a second virtual process at the computer;
identifying an inactive state of the first virtual process;
generating one or more configuration updates that determine which of a plurality of virtual network interface controllers is linked to which of a plurality of hardware network interface controllers, wherein the one or more configuration updates further identify that the second virtual process is active and synchronized in accordance with the state information for continued performance of the processing operations on the data packets;
continuing the processing operations on the data packets by the second virtual process based on the state information, wherein the second virtual process continues performance of the processing operations on the data packets based on the one or more configuration updates;
generating a third virtual process that is synchronized in accordance with second state information for continued performance of the processing operations by the second virtual process, wherein the third virtual process is designated as a backup process, and wherein the second state information associated with the processing operations performed by the second virtual process is accessible by the third virtual process; and instructing the third virtual process to process a set of remaining data packets unprocessed by the second virtual process upon detection of inactivity of the second virtual process based on the second state information accessible by the third virtual process.

11. The non-transitory computer-readable storage medium of claim 10, the program further executable to initiate operation of the third virtual process at the computer.

12. The non-transitory computer-readable storage medium of claim 11, the program further executable to:
receive a first set of liveness information associated with the first virtual process, wherein identifying the inactive state of the first virtual process has stopped processing the data packets is based on the first set of liveness information; and
receive a second set of liveness information associated with the second virtual process.

13. The non-transitory computer-readable storage medium of claim 11, the program further executable to:
receive additional state information from the second virtual process;
identify that the second virtual process has stopped processing additional data packets;
and continue processing the additional data packets by the third virtual process based on the additional state information provided by the second virtual process.

14. The non-transitory computer-readable storage medium of claim 10, the program further executable to:
initiate the first virtual process at the computer;
initiate the second virtual process at the computer;
configure the first virtual process to receive the data packets via a first hardware network interface controller of the plurality of hardware network interface controllers; and
receive the data packets via the first hardware network interface controller by the first virtual process based on an initial configuration.

15. The non-transitory computer-readable storage medium of claim 14, the program further executable to:
configure the first virtual process to send the data packets via a second hardware network interface controller of the plurality of hardware network interface controllers; and
send the data packets via the second hardware network interface controller by the first virtual process based on the initial configuration.

16. The non-transitory computer-readable storage medium of claim 10, the program further executable to:
monitoring for liveness of the first virtual process, wherein the liveness corresponds to an active or inactive state of the first virtual process; and
receive a first set of liveness information associated with the first virtual process, wherein the first set of liveness information indicates the first virtual process is active.

17. The non-transitory computer-readable storage medium of claim 10, the program further executable to store information regarding an initial configuration that identifies that the first virtual process is in an active state and that the second virtual process is available to take over processing tasks from the first virtual process.

18. The non-transitory computer-readable storage medium of claim 10, the program further executable to:
initiate an initial set of processing operations on initial data packets received via a first communication session that is different from a second communication session associated with the data packets processed by the first virtual process, the initial set of processing operations associated with an active virtual process and an inactive virtual process;

receive additional state information associated with the processing operations of the initial set performed by the active virtual process;

identify that the active virtual process has erred; and process the initial data packets received via the first communication session by the inactive virtual process in accordance with the additional state information based on the identification that the active virtual process has erred.

19. An apparatus for providing redundancy in a computer, the apparatus comprising:

a first hardware network interface that receives data packets via a first computer network;

a memory; and a processor that executes instructions out of the memory to:

perform a plurality of processing operations on the data packets by a first virtual process at the computer, wherein the data packets are processed based on an initial configuration that associates the first hardware network with the first virtual process;

receive state information associated with the processing operations performed by the first virtual process on the data packets, the state information accessible by a second virtual process at the computer;

identify an inactive state of the first virtual process;

generate one or more configuration updates that determine which of a plurality of virtual network interface controllers is linked to which of a plurality of hardware network interface controllers, wherein the one or more configuration updates further identify that the second virtual process is active and synchronized in accordance with the state information for continued performance of the processing operations on the data packets;

continue the processing operations on the data packets by the second virtual process based on the state information, wherein the second virtual process continues performance of the processing operations on the data packets based on the one or more configuration updates;

generate a third virtual process that is synchronized in accordance with second state information for continued performance of the processing operations by the second virtual process, wherein the third virtual process is designated as a backup process, and wherein the second state information associated with the processing operations performed by the second virtual process is accessible by the third virtual process; and instruct the third virtual process to process a set of remaining data packets unprocessed by the second virtual process upon detection of inactivity of the second virtual process based on the second state information accessible by the third virtual process.

20. The apparatus of claim 19, further comprising a second hardware interface that sends data associated with the data packets to another computer after the data packets have been processed by at least one of the first virtual process or the second virtual process.

* * * * *